(12) United States Patent
Figura et al.

(10) Patent No.: US 9,547,168 B2
(45) Date of Patent: *Jan. 17, 2017

(54) MECHANICAL STRESS MITIGATION IN ELECTROWETTING DISPLAY STRUCTURES

(71) Applicant: Amazon Technologies, Inc., Reno, NV (US)

(72) Inventors: Daniel Figura, Piestany (SK); Toru Sakai, Waalre (NL); Christian Etienne Hendriks, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/727,646

(22) Filed: Jun. 1, 2015

(65) Prior Publication Data

US 2015/0260983 A1 Sep. 17, 2015

Related U.S. Application Data

(63) Continuation of application No. 14/072,384, filed on Nov. 5, 2013, now Pat. No. 9,046,682.

(51) Int. Cl.
*G02B 26/00* (2006.01)
*G02B 26/02* (2006.01)
(Continued)

(52) U.S. Cl.
CPC .............. *G02B 26/005* (2013.01); *G09G 3/34* (2013.01); *G09G 3/348* (2013.01); *G09G 3/3426* (2013.01);
(Continued)

(58) Field of Classification Search
CPC ..... G02B 26/00; G02B 26/004; G02B 26/005; G02B 26/02; G09G 3/34; G09G 3/348; G09G 3/3426; G09G 5/10; G09G 2300/04; G09G 2300/0404; G09G 2300/08; B01L 3/5027; B01L 3/502715
(Continued)

(56) References Cited

U.S. PATENT DOCUMENTS 7,515,340 B1 * 4/2009 Shiu ..................... G02B 26/005
                                                                  359/462
7,813,030 B2  10/2010 Lo et al.
7,909,974 B2 *  3/2011 Bartels ................. G02B 26/005
                                                                  156/349

(Continued)

FOREIGN PATENT DOCUMENTS

WO    WO2013053647    4/2013
WO    WO2013087858    6/2013

OTHER PUBLICATIONS

"EWetting 1024×576 Final", uploaded by Liquavista, Nov. 4, 2013, retrieved on Dec. 31, 2014 at <<https://www.youtube.com/watch?v=3pM-q7P0Kgo, 5 pages.
(Continued)

*Primary Examiner* — Loha Ben
(74) *Attorney, Agent, or Firm* — Lee & Hayes, PLLC

(57) ABSTRACT

The subject matter disclosed herein relates to an electrowetting display comprising: a dielectric barrier layer formed on a substrate; a hydrophobic layer formed on the dielectric barrier layer, wherein the dielectric barrier layer maintains a separation between the hydrophobic layer and the substrate; a patterned pixel grid formed on the hydrophobic layer, wherein the patterned pixel grid comprises rows and columns of pixel walls that form field pixels and border pixels; an oil film overlying the hydrophobic layer, wherein the oil film is partitioned by the patterned pixel grid; and an electrolyte overlying the oil film and the patterned pixel grid, wherein one or more of the rows or the columns of pixel walls of the patterned pixel grid includes a substantially
(Continued)

nonlinear-shaped portion to reduce sheer stress between the patterned pixel grid and the hydrophobic layer.

20 Claims, 7 Drawing Sheets

(51) Int. Cl.
*G09G 3/34* (2006.01)
*G09G 5/10* (2006.01)

(52) U.S. Cl.
CPC ............ *G09G 5/10* (2013.01); *G09G 2300/04* (2013.01); *G09G 2300/0404* (2013.01); *G09G 2300/08* (2013.01); *Y10T 29/417* (2015.01)

(58) Field of Classification Search
USPC ....... 359/290, 291, 295, 228, 253, 245, 665; 345/87, 204, 60; 422/500–502
See application file for complete search history.

(56) References Cited

U.S. PATENT DOCUMENTS

| | | | |
|---|---|---|---|
| 8,059,328 B1 * | 11/2011 | Kuo | G02B 26/005 359/290 |
| 8,416,503 B2 * | 4/2013 | Hsieh | G02B 3/14 359/665 |
| 8,599,465 B2 * | 12/2013 | Hsieh | G02B 3/14 345/107 |
| 8,679,423 B2 * | 3/2014 | Fouillet | B01L 3/502707 204/450 |
| 8,780,435 B2 | 7/2014 | Park et al. | |
| 8,830,558 B2 | 9/2014 | Kuo et al. | |
| 8,885,261 B2 | 11/2014 | Takai et al. | |
| 8,896,904 B2 | 11/2014 | Massard et al. | |
| 9,046,682 B2 * | 6/2015 | Figura | G09G 3/34 |
| 2009/0169806 A1 | 7/2009 | Lo et al. | |
| 2012/0268005 A1 | 10/2012 | Furihata et al. | |
| 2014/0240985 A1 | 8/2014 | Kim et al. | |

OTHER PUBLICATIONS

Feenstra, et al., "Electrowetting Displays", retrieved on Dec. 31, 2014 at <<http://www.liquavista.com/news-and-events/media-and-downloads/>>, Liquavista BV, May 2009, p. 14.

PCT Search Report and Written Opinion mailed Feb. 9, 2015 for PCT Application No. PCT/US14/63575, 10 Pages.

* cited by examiner

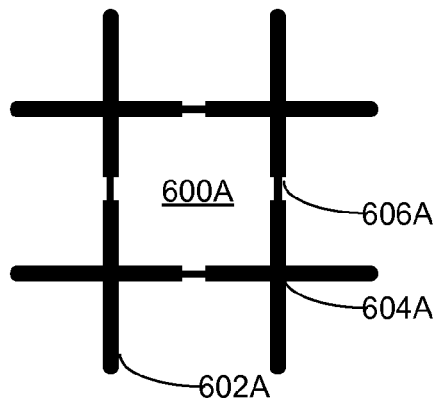
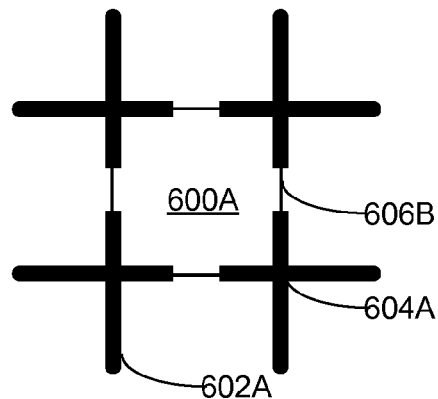
FIG. 6A	FIG. 6B
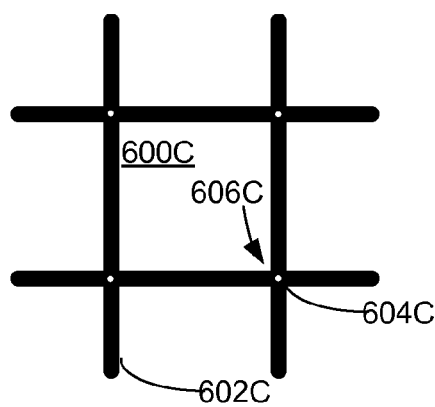
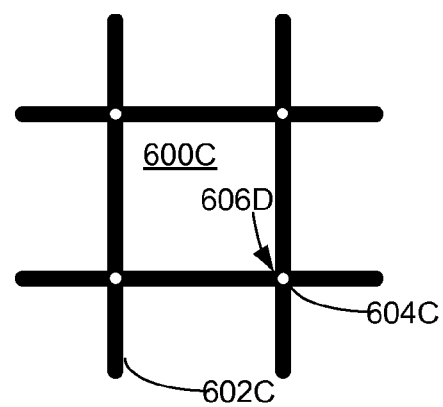
FIG. 6C	FIG. 6D

```
                                    ┌─ 1000
┌─────────────────────────────────┐ ╱
│ FORM A DIELECTRIC BARRIER LAYER │╱
│          ON A SUBSTRATE         │
│              1002               │
└─────────────────────────────────┘
                 │
                 ▼
┌─────────────────────────────────┐
│ FORM A HYDROPHOBIC LAYER ON THE │
│ DIELECTRIC BARRIER LAYER,       │
│ WHEREIN THE DIELECTRIC BARRIER  │
│ LAYER MAINTAINS A SEPARATION    │
│ BETWEEN THE HYDROPHOBIC LAYER   │
│       AND THE SUBSTRATE         │
│              1004               │
└─────────────────────────────────┘
                 │
                 ▼
┌─────────────────────────────────┐
│ FORM A PATTERNED PIXEL GRID ON  │
│ THE HYDROPHOBIC LAYER, WHEREIN  │
│ THE PATTERNED PIXEL GRID        │
│ COMPRISES ROWS AND COLUMNS OF   │
│ PIXEL WALLS THAT FORM FIELD     │
│     PIXELS AND BORDER PIXELS    │
│              1006               │
└─────────────────────────────────┘
                 │
                 ▼
┌─────────────────────────────────┐
│ PLACE AN OIL FILM ON THE        │
│ HYDROPHOBIC LAYER, WHEREIN THE  │
│ OIL FILM IS PARTITIONED BY THE  │
│     PATTERNED PIXEL GRID        │
│              1008               │
└─────────────────────────────────┘
                 │
                 ▼
┌─────────────────────────────────┐
│ PLACE AN ELECTROLYTE ON THE OIL │
│ FILM AND ON THE PATTERNED PIXEL │
│ GRID, WHEREIN ONE OR MORE OF    │
│ THE ROWS OR THE COLUMNS OF      │
│ PIXEL WALLS OF THE PATTERNED    │
│ PIXEL GRID INCLUDE A            │
│ SUBSTANTIALLY NONLINEAR-SHAPED  │
│ PORTION TO REDUCE SHEER STRESS  │
│ BETWEEN THE PATTERNED PIXEL     │
│ GRID AND THE HYDROPHOBIC LAYER  │
│              1010               │
└─────────────────────────────────┘
```

MECHANICAL STRESS MITIGATION IN ELECTROWETTING DISPLAY STRUCTURES

CROSS-REFERENCE TO RELATED APPLICATIONS

This U.S. non-provisional patent application is a continuation of and claims priority to U.S. patent application Ser. No. 14/072,384, filed on Nov. 5, 2013, now U.S. Pat. No. 9,046,682, the contents of which are incorporated herein by reference.

BACKGROUND

Modern communication devices typically have user interfaces that include high-quality displays (e.g., color, greater than 300 pixels per inch (ppi), 800:1 contrast ratio, and so on). Increased multimedia use imposes high demands on designs of display modules incorporated in these devices. An electrowetting display meets demands of such modern devices and performs well in high ambient light conditions (e.g., in sunlight), has relatively fast video speed, and relatively low power consumption. Accordingly, an electrowetting display can replace a liquid crystal display (LCD) in a number of devices such as mobile phones, handheld computing devices, cameras and so on.

An electrowetting display includes an array of pixels individually bordered by pixel walls that retain opaque oil. Light transmission through each pixel is adjustable by electronically controlling a position of the oil in the pixel. A process of fabricating an electrowetting display includes a number of steps that impose undesirable thermal stresses on various elements of the electrowetting display. Such thermal stresses can lead to deformation of the pixels and the pixel walls, thereby potentially changing the position of the pixel walls with respect to the underlying layers and adversely affect image quality displayed by the electrowetting display.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIGS. 6A-6D are top views of a pixel region including stress release features, according to various embodiments.

FIG. 10 illustrates a process of fabricating an electrowetting device, according to various embodiments.

DETAILED DESCRIPTION

Overview

Figure 1:
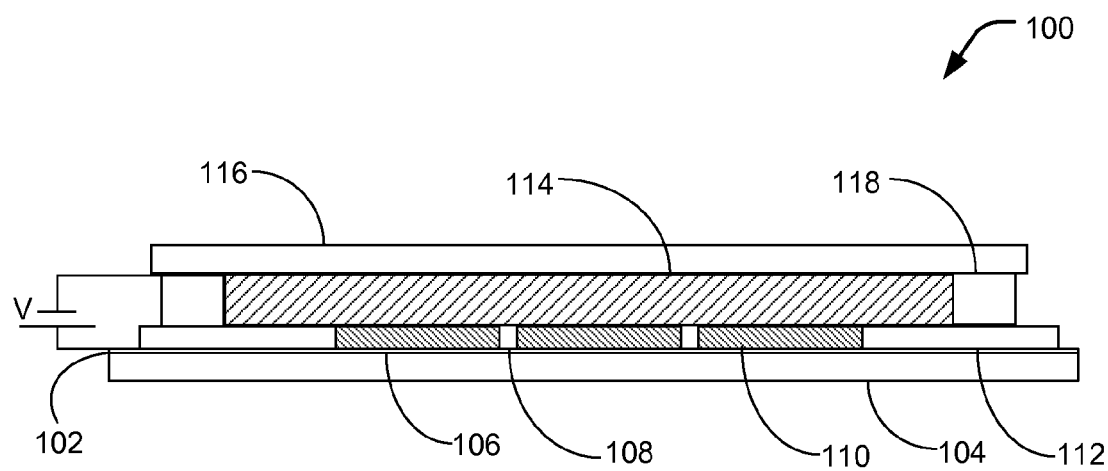
FIG. 1 is a cross-section of an electrowetting device, according to some embodiments.

Electrowetting displays include an array of pixels comprising border pixels and field pixels. Border pixels, as used herein, are pixels located on edges of the array of pixels, adjacent to an outer rim of the electrowetting display. Pixels of the array of pixels other than border pixels are field pixels. Individual pixels are surrounded by a pixel wall made, for instance, from photoresist material. Pixel walls retain oil in the individual pixels. During a process of fabricating an electrowetting display, pixel wall material (e.g., photoresist material) is deposited onto a hydrophobic fluoropolymer layer. Due to the hydrophobicity of this material, the pixel wall material will normally not stick to it. The fabricating process thus modifies the fluoropolymer layer so that it is hydrophilic. Such a surface modification can be performed using, for example, reactive ion etching (RIE) or plasma etching or UV Ozone treatment. Accordingly, the pixel material will adhere to the modified fluoropolymer layer so that the pixel wall structure can be processed. After deposition of the pixel wall material, however, the hydrophilic property of the modified fluoropolymer layer is no longer desirable. Thus, the hydrophobic property of the modified fluoropolymer layer needs to be restored, which can be accomplished using thermal reflow at elevated temperatures.

Unfortunately, this reflow step can lead to shrinkage subsequent to cooling from the elevated temperatures (e.g., cross-linking and densification and/or thermal contraction) of the pixel wall material (e.g., photoresist). This shrinkage causes stress in the photoresist layer and can be manifested as cracks in pixel walls and/or movement of the pixel walls relative to an underlying substrate. Such shrinkage may be proportional to the amount of photoresist material. In particular embodiments, shrinkage is proportional to coverage area of the photoresist material on the underlying substrate. For example, if shear stress (e.g., caused by thermal contraction or expansion) overwhelms adhesion between the photoresist layer and the underlying substrate, the structure can delaminate. If the shear stress is relatively low so that adhesion remains, the pixel walls can crack or bend. The photoresist being deposited on the relatively soft fluoropolymer surface may be a principle reason that stresses can lead to deformation of the photoresist material. For example, at elevated temperatures the fluoropolymer layer is plastically deformable (e.g., has liquid-like behavior) so structures on the fluoropolymer layer can move to reduce the stresses, thereby negatively impacting the registration of the pixel wall structures with respect to the underlying layers.

Modifying the fabrication process, such as by altering UV exposure dosage and/or modifying curing conditions of the photoresist, can reduce stresses introduced by the thermal reflow step. But stresses are likely to not be eliminated completely. Accordingly, embodiments described herein include fabrication processes and structures to reduce such stresses and mitigate effects of such stresses on the active display pixels. Additionally, these fabrication processes and structures allow use of a wider selection of different photoresist materials having various properties.

In some embodiments, pixel walls and/or an outer rim of the display area include structural features to mitigate stress that can lead to pixel wall and pixel deformation. In particular, pixel walls can include structural features or portions configured to reduce the impact of sheer stress between pixel wall material and an underlying hydrophobic layer on the position of the array of pixels. For example, such structural features can be introduced in the fabrication process by including particular patterns in a mask used for patterning the photoresist layer. Among possible implementations, such structural features of the pixel walls can include curves, bends, spring-shaped (e.g., serpentine) structures, relatively thin portions, voids, gaps between the outer rim of the pixel display area and the pixel walls, zigzag wall-intersection patterns and angled connections between the pixel walls and the outer rim. Curves or bends in the pixel walls, for example, can be shaped or configured to straighten in response to stress. In other words, a pixel wall can be "pre-bent" in anticipation of stresses due to fabrication processes that subsequently result in a straightening of the pixel wall to a desirable linear shape. Some implementations are directed more toward mitigating stress in field pixels while other implementations are directed more toward mitigating stress in edge pixels near the outer rim and thereby mitigating the effects of the stresses on the field pixels. Including structural features to mitigate stress can provide a number of benefits, such as reducing distortion and improving quality of the electrowetting display structure, improving fabrication yield and allowing for relatively reliable fabrication process conditions that are substantially independent of photoresist properties. Hereinafter, structural features to mitigate stress are referred to as stress release features. Though directed toward electrowetting display structures, embodiments described herein can also mitigate stress or effects of stress in any of a number of semiconductor structures, semiconductor packaging, microfluidic structures, or microstructures that involve a photoresist layer, for example.

Illustrative Structures and Processes

FIG. 1 is a cross-section of an electrowetting device 100, according to some embodiments. A dielectric barrier layer 102 is formed on a substrate 104. A hydrophobic layer 106 is formed on dielectric barrier layer 102, which maintains a separation between hydrophobic layer 106 and substrate 104. Such separation can, among other things, prevent electrolysis occurring through the hydrophobic layer 106. In some implementations, hydrophobic layer 106 can comprise a fluoropolymer, such as AF1600, produced by DuPont, based in Wilmington, Del. Pixel walls 108 form a patterned pixel grid (visible in a top view such as FIG. 2) on hydrophobic layer 106. Pixel walls 108 comprise a photoresist material, such as epoxy-based negative photoresist SU-8. The patterned pixel grid comprises rows and columns that form a pixel array (e.g., display area) of field pixels and border pixels. For example, a pixel can have a width and length in a range of about 50 to 500 microns. An oil film 110, which can have a thickness in a range of about 1 to 10 microns, for example, overlies hydrophobic layer 106. Oil film 110 is partitioned by pixel walls 108 of the patterned pixel grid. An outer rim 112 can comprise the same material as pixel walls 108. An electrolyte 114 overlies oil film 110 and pixel walls 108 of the patterned pixel grid. A cover plate 116 covers electrolyte 114 and edge seals 118 retain electrolyte 114 over the pixel array. A voltage V applied across the oil film 110 and the dielectric barrier layer stack (e.g., comprising dielectric barrier layer 102 and hydrophobic layer 106) of individual pixels can control transmittance or reflectance of the individual pixels. One or more of the rows or the columns of pixel walls 108 of the patterned pixel grid include a stress release feature which, for example, can comprise a substantially nonlinear-shaped portion (visible in a top view such as FIG. 2) to reduce sheer stress between the patterned pixel grid and hydrophobic layer 106, as described below.

Figure 2:
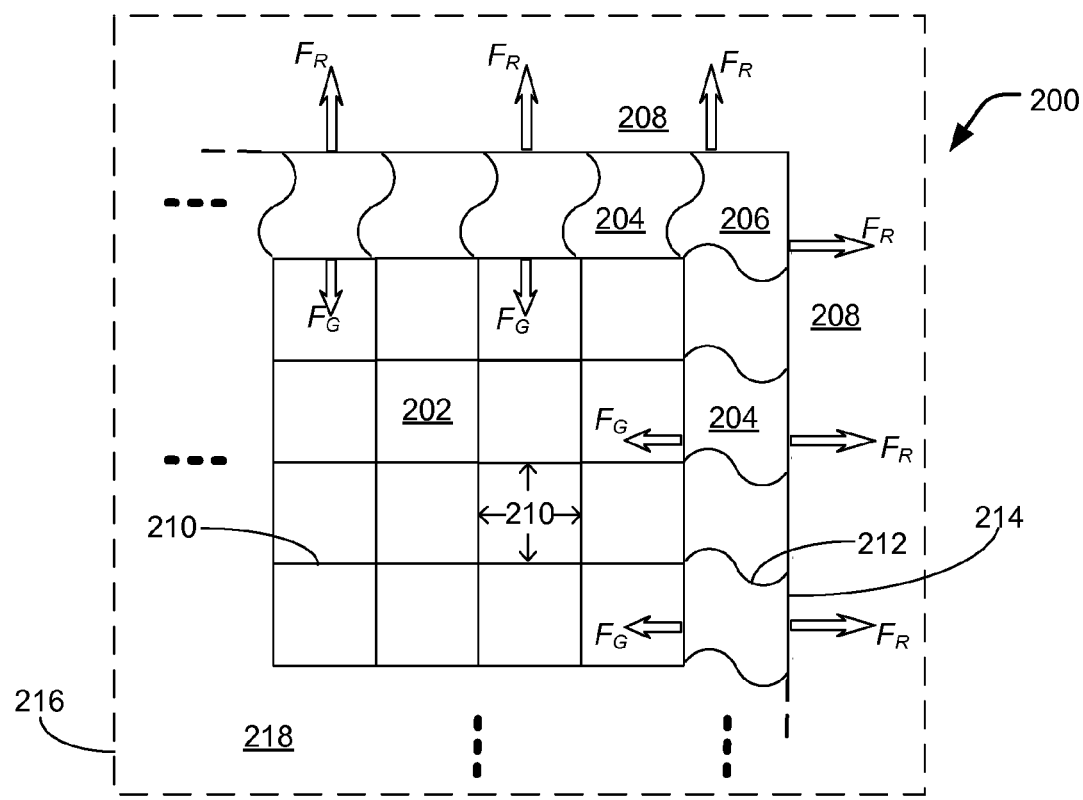
FIG. 2 is a top view of a portion of an electrowetting device, according to some embodiments.

FIG. 2 is a top view of a portion 200 of an electrowetting device, according to some embodiments. For example, the electrowetting device may be the same as or similar to that illustrated in FIG. 1. Portion 200 includes a number of field pixels 202, border pixels 204 and a corner pixel 206. These pixels are surrounded by an outer rim 208. Pixel walls 210 surround individual field pixels 202. Pixel walls 210 are substantially linear. On the other hand, pixels walls 212 that partially surround individual border pixels 204 include a stress release feature, which can be substantially nonlinearly-shaped. For example, pixel wall 212 has a serpentine shape so as to have compressible or extendable characteristics. Pixel walls 212 extend from pixel walls 210 of field pixels 202 to the edge 214 of outer rim 208. An underlying substrate 216 is covered with a fluoropolymer layer 218.

In some embodiments, a stress release feature includes curved or pre-bent pixel walls in place of the serpentine or spring-like shaped pixel wall portion shown in FIG. 2. For example, pixel walls can be fabricated to have a pre-bent or curved shape. Upon or after undergoing shrinkage during a reflow fabrication process, the pixel walls can straighten to be substantially linear. For example, a pixel wall having a 4.0 micron pre-bend can straighten to form a pixel wall having a bend of about 2.0 microns subsequent to shrinkage.

FIG. 2 includes several block arrows that indicate forces induced by shrinkage of photoresist material that forms pixel walls 210, 212 and outer rim 208. As described above, such shrinkage can arise from a thermal reflow process to make fluoropolymer layer 218 hydrophobic after deposition and thermal cross-linking of pixel walls 210, 212 and outer rim 208. The photoresist material of the pixel walls and outer rim contracts relative to the underlying substrate 216 and overlying fluoropolymer layer 218. Such contraction leads to a force $F_G$ in a direction into the pixel region. Force $F_G$ is countered by an oppositely-directed force $F_R$. The magnitude of force $F_R$ is based, at least in part, on the coverage area of photoresist material that forms outer rim 208. On the other hand, the magnitude of force $F_G$ is based, at least in part, on the coverage area of photoresist material that forms pixel walls 210 and 212. The coverage area of photoresist material that forms outer rim 208 is substantially greater than the coverage area of photoresist material that forms pixel walls 210 and 212. Accordingly, $F_R$ is typically greater than force $F_G$. These two unequal forces lead to an unstable physical state of the electrowetting device structure. As a result, the two forces $F_G$ and $F_R$ will equalize and lead to a stable physical state only after undesirable deformation of the structure occurs.

In the case where border pixel walls 212 are substantially nonlinearly-shaped (e.g., have a serpentine shape so as to have compressible, stretchable, and/or spring-like characteristics), as illustrated in FIG. 2, such deformation occurs primarily in border pixel walls 212. Consequently, field pixels 202 and field pixel walls 210 are spared from substantial deformation. In contrast, in a case (not illustrated) where border pixel walls 212 are substantially linear and rigid (e.g., lacking spring-like characteristics), field pixels 202, border pixels 204 and their respective pixel walls can be substantial deformed by the unequal forces $F_G$ and $F_R$.

In some implementations, border pixels 204 are not functional pixels. In other words, border pixels 204 are not capable of operating as a display pixel. Accordingly, border pixels 204 need not include oil or an overlying electrolyte (border pixels 204 can nevertheless be filled with oil and electrolyte from the same part of the fabrication process that also fills field pixels 202). Thus, border pixels 204 act generally as physical buffers having pixel walls that at least partially absorb deformation resulting from forces $F_G$ and $F_R$.

Figure 3:
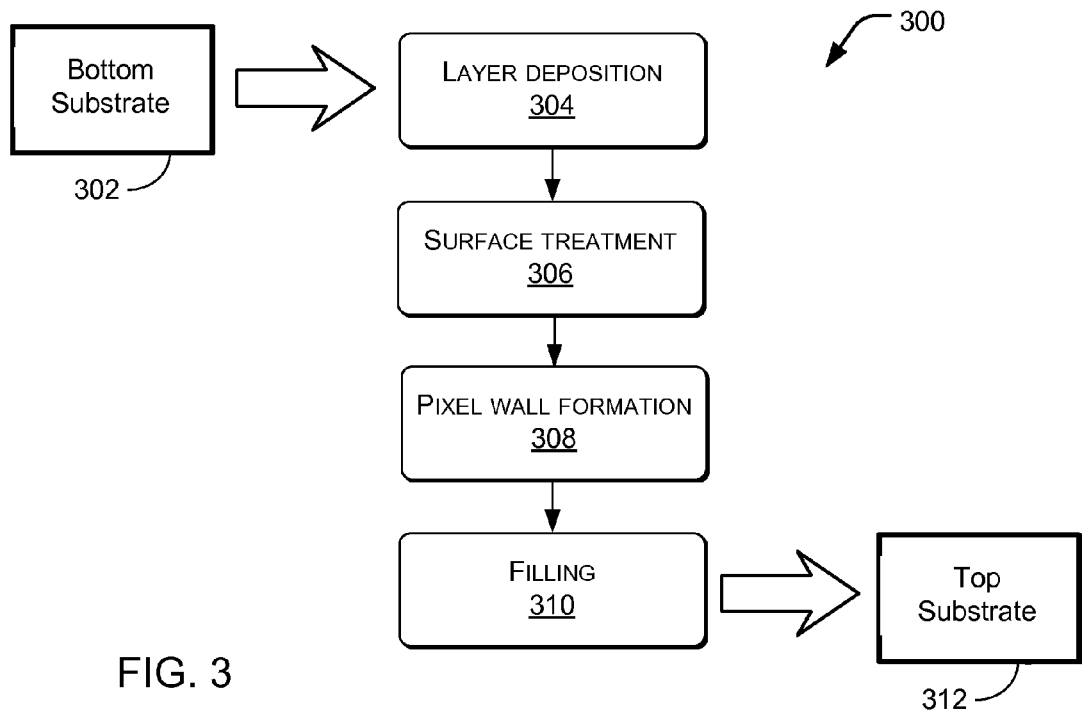
FIG. 3 is a flow diagram of a process for fabricating an electrowetting device, according to various embodiments.

FIG. 3 is a flow diagram of a process 300 for fabricating an electrowetting device, such as electrowetting device 100, according to various embodiments. Process 300 can begin with a bottom substrate 302, which can comprise a transparent glass material coated with indium-tin-oxide (ITO), for example. A barrier layer and a fluoropolymer layer are formed in deposition step 304. Surface treatment step 306 is used to modify the originally-hydrophobic fluoropolymer layer to be hydrophilic so that a photoresist layer can adhere to the fluoropolymer layer. Subsequent to the surface treatment, photoresist can be deposited (e.g., by spin coating) on the fluoropolymer layer in a pixel wall formation step 308 that produces pixel walls and an outer rim that surrounds the pixels of the electrowetting device display area. A masking pattern is used to form particularly-shaped pixel walls from the photoresist layer. For example, the masking pattern can include portions that produce pixel walls having stress release features such as spring-shaped pixel wall structures, gaps between the outer rim and the pixel walls, zigzag wall-intersection patterns, pre-bent pixel wall portions and indentations in the pixel walls where the pixel walls are locally substantially less wide then other portions of the pixel walls.

Subsequent to forming pixel walls and the outer rim, thermal reflow re-establishes the hydrophobic nature of the fluoropolymer layer and cross-links the pixel wall material. As explained above, this reflow step leads to stresses, which can be mitigated by pixel walls including stress release features. These features can be produced by a masking pattern used in pixel wall formation step 308.

Filling step 310 involves placing a seal over a portion of the outer rim, filling pixel recesses (e.g., formed by pixel walls) with oil, covering the oil and the pixel walls with an electrolyte and placing a top substrate 312 to cover the structure and encapsulate the oil and electrolyte.

Figure 4:
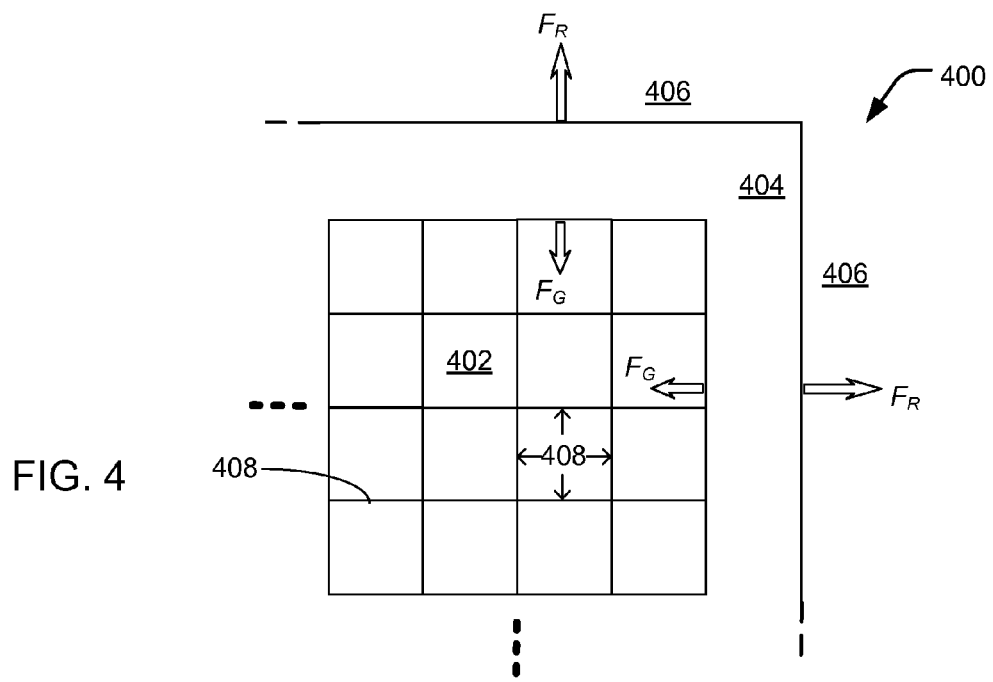
FIG. 4 is a top view of a portion of an electrowetting device, according to some embodiments.

FIG. 4 is a top view of a portion 400 of an electrowetting device, according to several embodiments. For example, the electrowetting device may be the same as or similar to electrowetting device 100 illustrated in FIG. 1. Portion 400 includes a number of field pixels 402 and a border region 404. Field pixels 402 and border region 404 are surrounded by an outer rim 406. Border region 404 comprises an open region void of pixel walls that would otherwise connect portions of field pixels 402 with portions of outer rim 406. Pixel walls 408 surround individual field pixels 402. Pixel walls 408, which are substantially linear, are physically decoupled from outer rim 406. This structure contrasts from the structure illustrated in FIG. 2 which, for example, includes serpentine shaped pixel walls 212 that physically couple field pixel walls 210 to outer rim 208.

FIG. 4 includes several block arrows that indicate forces induced by contraction of photoresist material that forms pixel walls 408 and outer rim 406. During a reflow process, the photoresist material of outer rim 406 contracts, leading to a force $F_R$ in a direction away from the pixel region. An oppositely-directed force $F_G$ is generated from contraction of pixel walls 408 of field pixels 402. Force $F_R$ is based, at least in part, on the coverage area of photoresist material that forms outer rim 406. On the other hand, force $F_G$ is based, at least in part, on the coverage area of photoresist material that forms pixel walls 408. The coverage area of photoresist material that forms outer rim 406 is substantially greater than the coverage area of photoresist material that forms pixel walls 408. Accordingly, force $F_R$ is greater than force $F_G$. These two unequal forces are physically decoupled by the open region provided by border region 404. Thus, force $F_R$ can pull outer rim 406 away from field pixels 402 without deforming the field pixels. Meanwhile, force $F_G$ can pull field pixels 402 adjacent to border region inward. This can lead to deformation of field pixels 402. Fortunately, force $F_G$ is relatively weak, so such deformation is relatively small (e.g., not substantially affecting field pixels 402).

Border region 404, though not functional as a pixel, can include oil and/or an overlying electrolyte, which are placed during the fabrication process that fills field pixels with oil and the electrolyte. Border region 404 can generally act as a physical buffer since there is no coupling of forces $F_G$ and $F_R$ across border region 404.

Figure 5:
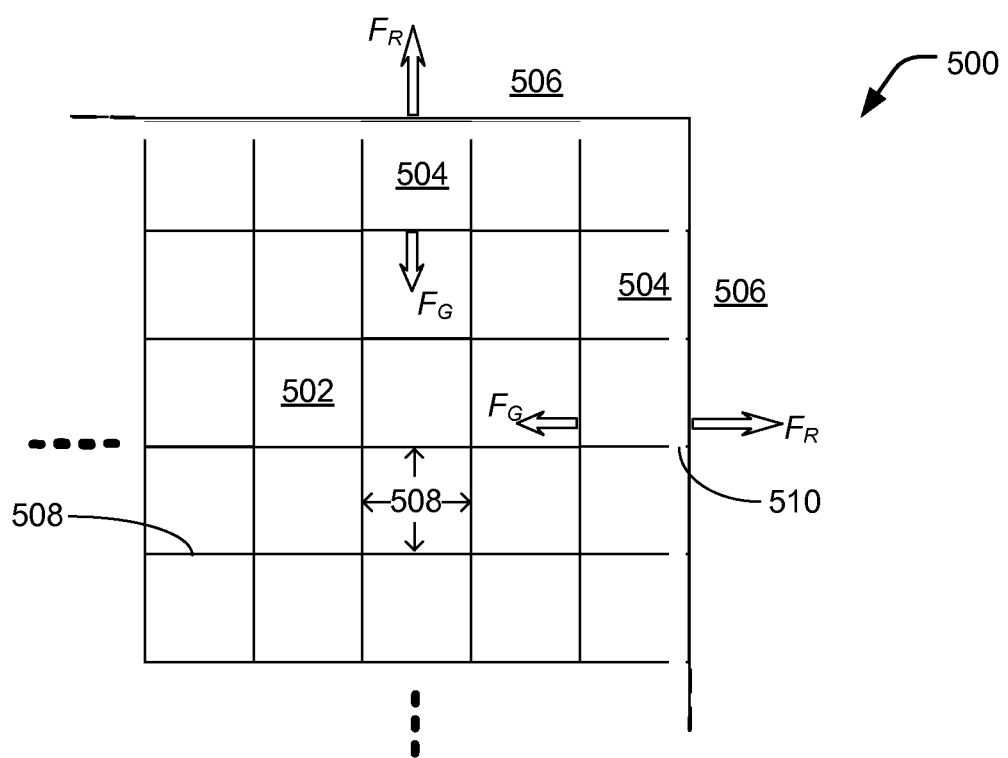
FIG. 5 is a top view of a portion of an electrowetting device, according to some other embodiments.

FIG. 5 is a top view of a portion 500 of an electrowetting device, according to various embodiments. For example, the electrowetting device may be the same or similar to electrowetting device 100 illustrated in FIG. 1. Portion 500 includes a number of field pixels 502 and border pixels 504 that are surrounded by an outer rim 506. Pixel walls 508 surround individual field pixels 502. Pixel walls 508, which are substantially linear, are physically decoupled from outer rim 506 by a gap 510. This structure contrasts from the structure illustrated in FIG. 4, which also includes field pixels physically decoupled from the outer rim, but is void of border pixels.

FIG. 5 includes several block arrows that indicate forces induced by thermal contraction of photoresist material that forms pixel walls 508 and outer rim 506. During a reflow process, the photoresist material of outer rim 506 contracts, leading to a force $F_R$ in a direction away from the pixel region. An oppositely-directed force $F_G$ is generated from contraction of pixel walls 508 of field pixels 502. Force $F_R$ is based, at least in part, on the coverage area of photoresist material that forms outer rim 506. On the other hand, force $F_G$ is based, at least in part, on the coverage area of photoresist material that forms pixel walls 508. The coverage area of photoresist material that forms outer rim 506 is substantially greater than the coverage area of photoresist material that forms pixel walls 508. Accordingly, force $F_R$ is greater than force $F_G$. These two unequal forces are physically decoupled by border pixels 504 that include pixel walls having gap 510. Thus, force $F_R$ can pull outer rim 506 away from field pixels 502 without deforming the field pixels. Meanwhile, force $F_G$ can pull border pixels 504 inward. This can lead to deformation of field pixels 502 near border pixels 504. Fortunately, force $F_G$ is relatively weak, so such deformation is relatively small.

Border pixels 504, though not functional as a pixel, can include oil and/or an overlying electrolyte, which are placed during the fabrication process that fills field pixels with oil and the electrolyte. Border pixels 504 can generally act as physical buffers having pixel walls that at least partially absorb deformation resulting from forces $F_G$ and $F_R$.

FIGS. 6A-6D are top views of a pixel region including stress release features, according to various embodiments. Stress release features described above generally reduce stresses by bending or rotation of portions of the pixel walls of a pixel. Stress release features can also include elements of a pixel wall or intersection of pixel walls that are fabricated by making some portions of the pixel wall or intersection relatively flexible and thus able to elongate under applied forces resulting from shrinkage. For example, a fabrication process can include underexposing a photoresist layer at portions of a masking pattern used to form pixel walls from the photoresist layer. These portions of the resulting pixel walls can consequently include features that are less rigid than other portions of the pixel walls and are easier to elongate under stress. Such features include relatively thin wall portions, holes and so on. In some implementations, an underexposing process step, as described above, need not be involved to fabricate such features. For example, a masking pattern can include these wall structures and/or holes in the pattern. In still other implementations, pixel walls can be fabricated from materials that vary depending on the portion of the pixel wall. For example, pixel walls can substantially comprise a first photoresist while a relatively small portion of the pixel walls, which include a stress release feature, can comprise a second photoresist material.

FIG. 6A shows a portion of a pixel array including a pixel 600A surrounded by pixel walls 602A that cross at intersections 604A. Pixel walls 602A include a stress release feature comprising a thin wall portion 606A. For example, thin wall portion 606A can be about 5 microns long, though claimed subject matter is not so limited. In another example, thin wall portion 606A can be thinner than the remaining portions of the pixel wall by about 10% to about 90%. FIG. 6B shows a portion of the pixel array including pixel 600A subsequent to a reflow step in a process to fabricate the pixel array. Accordingly, pixel walls 602A have axially elongated due to stress, resulting in elongated thin wall portions 606B. Such elongation helps to release stress in the pixel array.

FIG. 6C shows a portion of a pixel array including a pixel 600C surrounded by pixel walls 602C that cross at intersections 604C. Pixel wall intersections 604C include a stress release feature comprising a hole 606C. FIG. 6D shows a portion of the pixel array including pixel 600C subsequent to a reflow step in a process to fabricate the pixel array. Accordingly, pixel walls 602C impart forces outward from intersection 604C due to stress, resulting in larger holes 606D surrounded by relatively thin walls at intersection 604C.

Figure 7:
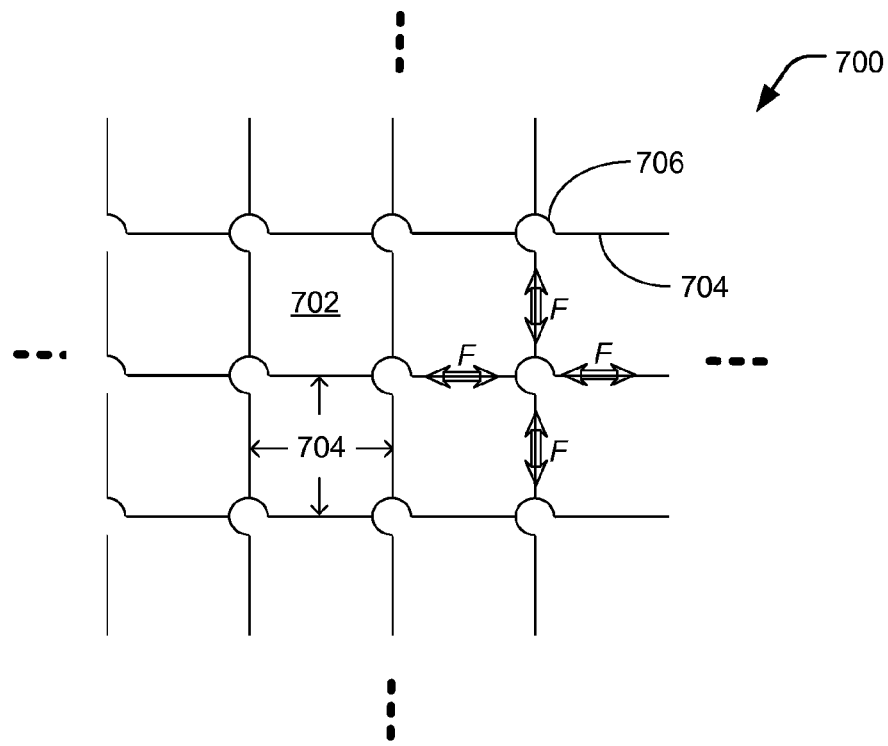
FIG. 7 is a top view of a portion of an electrowetting device, according to still other embodiments.

FIG. 7 is a top view of a pixel array portion 700 of an electrowetting device, according to some embodiments. For example, the electrowetting device may be the same or similar to electrowetting device 100 illustrated in FIG. 1. Portion 700 includes a number of field pixels 702 individually surrounded by pixel walls 704. Pixel wall intersections include a stress release feature comprising a C-shaped pixel wall structure 706, which can deform under imposing contraction or expansion forces F. Such deformation of C-shaped pixel wall structures 706 absorb at least a portion of these forces and prevent deformation of pixels 702. Block arrows in FIG. 7 represent several examples of such forces, which can act in any direction. The particular direction and magnitude of such forces on a wall intersection can depend, at least in part, on the position of the wall intersection in the pixel array of the electrowetting device. Such forces can deform C-shaped pixel wall structure 706 by compressing it in one axial direction while expanding it in another axial direction. In other situations, such forces can deform C-shaped pixel wall structure 706 by compressing it in more than one axial direction or expanding it in more than one axial direction. In other words, depending, at least in part, on where a particular C-shaped pixel wall structure is located relative to the pixel array, and what thermal expansion or contraction forces are present at that location, the particular C-shaped pixel wall structure can experience any number of compressive or expansive forces. In such cases, C-shaped pixel wall structures 706 can deform to absorb at least a portion of these forces to mitigate stress and deformation of pixels 702.

Figure 8:
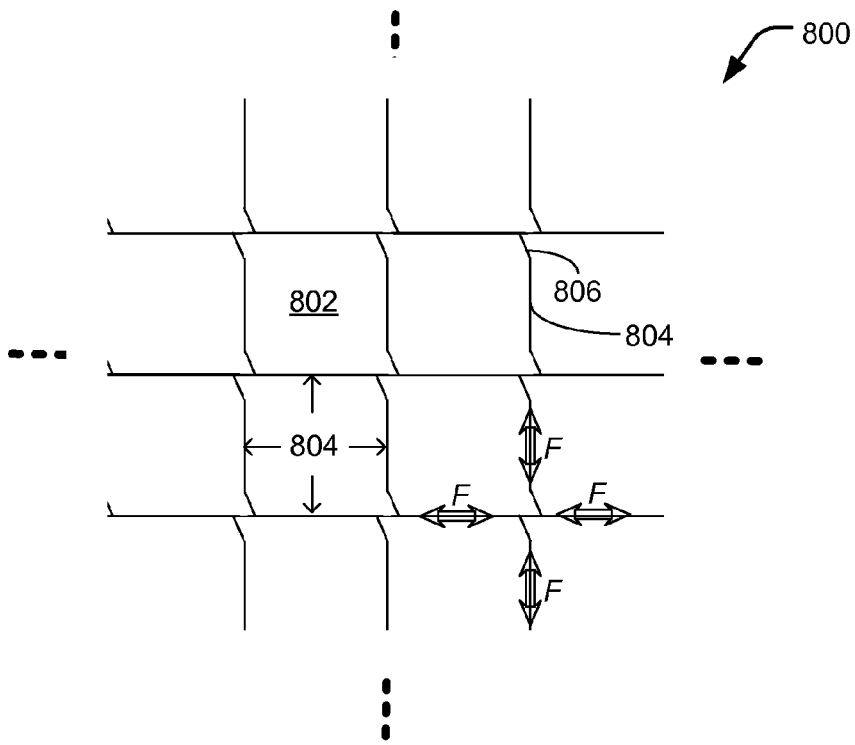
FIG. 8 is a top view of a portion of an electrowetting device, according to still other embodiments.

FIG. 8 is a top view of a pixel array portion 800 of an electrowetting device, according to some embodiments. For example, the electrowetting device may be the same or similar to electrowetting device 100 illustrated in FIG. 1. Portion 800 includes a number of field pixels 802 individually surrounded by pixel walls 804. Pixel wall intersections include a stress release feature comprising a zigzag wall structure 806, which can deform under imposing thermal contraction or expansion forces F. Such deformation of zigzag wall structures 806 absorb at least a portion of these forces and prevent deformation of pixels 802. Block arrows in FIG. 8 represent several examples of such forces, which can act in any direction. The particular direction and magnitude of such forces on a wall intersection can depend, at least in part, on the position of the wall intersection in the pixel array of the electrowetting device. Such forces can deform zigzag wall structure 806 by compressing it in one axial direction while expanding it in another axial direction. In other situations, such forces can deform zigzag wall structure 806 by compressing it in more than one axial direction or expanding it in more than one axial direction. In other words, depending, at least in part, on where a particular zigzag wall structure is located relative to the pixel array, and what thermal expansion or contraction forces are present at that location, the particular zigzag wall structure can experience any number of compressive or expansive forces. In such cases, zigzag wall structures 806 can deform to absorb at least a portion of these forces to mitigate stress and deformation of pixels 802.

Figure 9:
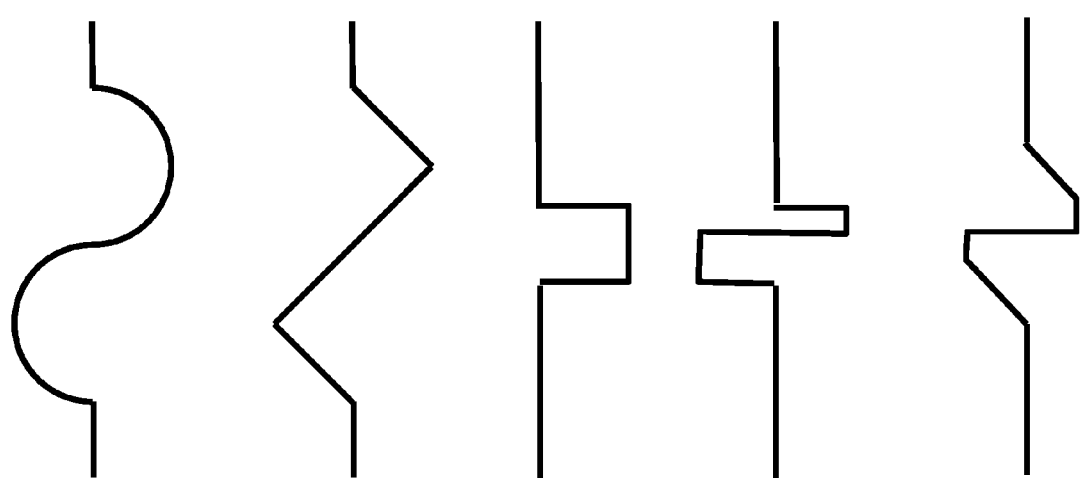
FIG. 9 shows top views of pixel wall portions, according to various embodiments.

In other embodiment, in addition to C-shapes or zigzag shapes, pixel wall intersections can have any of a number of shapes. For example, FIG. 9 shows top views of various shapes of pixel wall portions that can be incorporated at pixel wall intersections or any other portion of a pixel array, according to various embodiments.

FIG. 10 illustrates a process 1000 of fabricating an electrowetting device, according to various embodiments. For example, the electrowetting device may be the same or similar to electrowetting device 100 illustrated in FIG. 1, which is referred to in the following description. At block 1002, a dielectric barrier layer 102 is formed (e.g., by sputtering) on a substrate 104. At block 1004, a hydrophobic layer 106 is formed by, for example, spin coating on dielectric barrier layer 102, which maintains a separation between hydrophobic layer 106 and substrate 104. At block 1006, walls that form a patterned pixel grid comprising a photoresist material are formed on hydrophobic layer 106. The patterned pixel grid comprises rows and columns of pixel walls that form field pixels and border pixels. At block 1008, an oil film 110 is placed on the hydrophobic layer using a filling process. Oil film 110 is not continuous from pixel to pixel but instead is partitioned by the patterned pixel grid. At block 1010, an electrolyte 114 is placed on oil film 110 and on the patterned pixel grid. In some implementations, one or more of the rows or the columns of pixel walls of the patterned pixel grid include one or more stress release features to reduce sheer stress between the patterned pixel grid and the hydrophobic layer. For example, one type of stress release feature comprises a serpentine-shaped spring, which can be located in the border pixel region. In other implementations, one or more of the rows or the columns of pixel walls of the patterned pixel grid include another type of stress release feature comprising zigzag wall intersections to reduce sheer stress between the patterned pixel grid and the hydrophobic layer. These intersections are located in the field pixel region. In still other implementations, one or more of the rows or the columns of pixel walls of the patterned pixel grid include yet another type of stress release feature comprising C-shaped wall intersections or pre-bent pixel walls in the field pixel region.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display comprising:
   a hydrophobic layer;
   a fluid overlying at least a portion of the hydrophobic layer; and
   intersecting walls at least partially bordering a display region of the hydrophobic layer, wherein one or more portions of the intersecting walls include a stress release feature.

2. The electrowetting display of claim 1, wherein the stress release feature comprises a portion of the intersecting walls having one or more bends or curves configured to deform in response to sheer stress between the intersecting walls and the hydrophobic layer.

3. The electrowetting display of claim 2, wherein the deforming in response to sheer stress comprises straightening at least portions of the intersecting walls.

4. The electrowetting display of claim 1, wherein intersections of the intersecting walls include the stress release feature.

5. The electrowetting display of claim 1, wherein the stress release feature comprises voids in the intersecting walls.

6. The electrowetting display of claim 1, wherein the stress release feature comprises a hole located in intersections of the pixel walls.

7. The electrowetting display of claim 1, wherein the stress release feature comprises zigzag wall intersections.

8. The electrowetting display of claim 1, wherein the stress release feature comprises C-shaped wall intersections.

9. The electrowetting display of claim 1, wherein the stress release feature comprises a portion of the intersecting walls that is substantially thinner than other portions of the intersecting walls.

10. The electrowetting display of claim 1, wherein the intersecting walls substantially comprise a first material and the stress release feature comprises a second material different from the first material.

11. The electrowetting display of claim 1, wherein the intersecting walls comprise a photoresist material.

12. The electrowetting display of claim 1, wherein the hydrophobic layer comprises a fluoropolymer.

13. An electrowetting display comprising:
    a hydrophobic layer;
    rows and columns of pixel regions on the hydrophobic layer;
    intersecting walls that delineate the rows and columns of the pixel regions, wherein the intersecting walls include one or more stress release features; and
    a fluid overlying at least a portion of the hydrophobic layer in the pixel regions.

14. The electrowetting display of claim 13, further comprising:
    an outer rim at least partially bordering the pixel regions, wherein the one or more stress release features comprise a gap between the intersecting walls and the outer rim.

15. The electrowetting display of claim 13, wherein the one or more stress release features comprise a portion of the intersecting walls that is curved.

16. The electrowetting display of claim 13, wherein at least a portion of intersections of the intersecting walls include the stress release feature.

17. The electrowetting display of claim 13, wherein the one or more stress release features comprise voids in the intersecting walls.

18. The electrowetting display of claim 13, wherein the one or more stress release features comprise zigzag wall intersections.

19. The electrowetting display of claim 13, wherein the one or more stress release features comprise a portion of the intersecting walls that is substantially thinner than other portions of the intersecting walls.

20. The electrowetting display of claim 13, wherein the intersecting walls comprise a photoresist material.

* * * * *